United States Patent
Werbelow et al.

(10) Patent No.: US 10,718,356 B2
(45) Date of Patent: Jul. 21, 2020

(54) ASPIRATOR INFLATABLE DIFFUSER

(71) Applicant: Goodrich Corporation, Charlotte, NC (US)

(72) Inventors: Jeff Werbelow, Phoenix, AZ (US); Alok Koul, Tamil Nadu (IN)

(73) Assignee: GOODRICH CORPORATION, Charlotte, NC (US)

( * ) Notice: Subject to any disclaimer, the term of this patent is extended or adjusted under 35 U.S.C. 154(b) by 363 days.

(21) Appl. No.: 15/894,338

(22) Filed: Feb. 12, 2018

(65) Prior Publication Data

US 2019/0249690 A1 Aug. 15, 2019

(51) Int. Cl.
| | |
|---|---|
| *F04F 5/18* | (2006.01) |
| *F04F 5/44* | (2006.01) |
| *B64D 25/08* | (2006.01) |
| *F04F 5/46* | (2006.01) |
| *B64D 25/14* | (2006.01) |

(52) U.S. Cl.
CPC ............. *F04F 5/18* (2013.01); *B64D 25/08* (2013.01); *B64D 25/14* (2013.01); *F04F 5/44* (2013.01); *F04F 5/466* (2013.01)

(58) Field of Classification Search
CPC ...... F04F 5/18; F04F 5/44; F04F 5/466; B64D 25/08; B64D 25/14
See application file for complete search history.

(56) References Cited

U.S. PATENT DOCUMENTS

| | | | |
|---|---|---|---|
| 2010/0202899 A1* | 8/2010 | McNeil | B64D 25/14 417/189 |
| 2010/0266424 A1* | 10/2010 | Renz | F04F 5/463 417/191 |
| 2017/0016459 A1* | 1/2017 | Ruegsegger | F04F 5/48 |
| 2017/0297726 A1* | 10/2017 | Volny | B64D 25/14 |
| 2018/0155039 A1* | 6/2018 | Haynes | B64D 25/18 |

* cited by examiner

*Primary Examiner* — Rodney A Bonnette
(74) *Attorney, Agent, or Firm* — Snell & Wilmer, L.L.P.

(57) ABSTRACT

An aspirator may comprise an aspirator body defining an air channel and an inlet at a proximate end of the aspirator, and an inflatable barrel coupled to the aspirator body and defining an outlet at a distal end of the aspirator, wherein the inflatable barrel comprises a helical coil having a first interior volume and coupled about a barrel liner, wherein the barrel liner defines a second interior volume, wherein the air channel and the second interior volume define an airflow path extending from the air channel through the second interior volume the inflatable barrel.

20 Claims, 5 Drawing Sheets

ASPIRATOR INFLATABLE DIFFUSER

FIELD

The present disclosure is directed to evacuation systems for use in aircraft and, more particularly, to aspirators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the charged gas cylinder, combines gas from the atmosphere and the fluid to provide gas for inflating the emergency evacuation devices. Aspirators are typically stored in a limited packing space with the evacuation slide within a small space in the aircraft.

SUMMARY

An aspirator for an inflatable device is described herein, in accordance with various embodiments. An aspirator may comprise an aspirator body defining an air channel and an inlet.

In various embodiments, an aspirator may comprise an aspirator body defining an air channel and an inlet at a proximate end of the aspirator, and an inflatable barrel coupled to the aspirator body and defining an outlet at a distal end of the aspirator, wherein, the inflatable barrel comprises a helical coil having a first interior volume and coupled about a barrel liner, wherein the barrel liner defines a second interior volume, wherein the air channel and the second interior volume define an airflow path extending from the air channel through the second interior volume the inflatable barrel.

In various embodiments, the aspirator comprises a longitudinal axis, and the inflatable barrel extends in a direction parallel to the longitudinal axis of the aspirator in response to inflation. In various embodiments, the inflatable barrel further comprises a check valve in fluid communication with the first interior volume and the second interior volume. In various embodiments, the check valve is coupled to a compressed fluid source. In various embodiments, the aspirator further comprises a showerhead nozzle, wherein an arm of the showerhead nozzle is configured to align with an intake opening of the check valve. In various embodiments, the helical coil comprises a first coil section and a second coil section. In various embodiments, the first coil section is proximate a flange coupled to the aspirator body and the second coil section is proximate the distal end.

An evacuation system for use with an aircraft is also provided. The evacuation system may comprise an inflatable evacuation device configured to be inflated by a compressed fluid source. An aspirator may be coupled to the compressed fluid source and to the inflatable evacuation device. The aspirator may comprise an aspirator body defining an air channel and an inlet at a proximate end of the aspirator and, an aspirator body defining an air channel and an inlet at a proximate end of the aspirator, an inflatable barrel coupled to the aspirator body and defining an outlet at a distal end of the aspirator, wherein the inflatable barrel comprises a helical coil having a first interior volume and coupled about a barrel liner, wherein the barrel liner defines a second interior volume, wherein the air channel and the second interior volume define an airflow path extending from the air channel through the second interior volume the inflatable barrel.

In various embodiments, the aspirator comprises a longitudinal axis, and wherein the inflatable barrel extends in a direction parallel to the longitudinal axis of the aspirator in response to inflation. In various embodiments, the inflatable barrel further comprises a check valve in fluid communication with the first interior volume and the second interior volume. In various embodiments, the check valve is coupled to the compressed fluid source. In various embodiments, the aspirator further comprises a showerhead nozzle, wherein an arm of the showerhead nozzle is configured to align with an intake opening of the check valve. In various embodiments, the helical coil comprises a first coil section and a second coil section. In various embodiments, the first coil section is proximate a flange coupled to the aspirator body and the second coil section is proximate the distal end, wherein the flange is coupled to the inflatable evacuation device with the distal end within the interior of the evacuation device. In various embodiments, at least one of the first coil section or the second coil section further comprise a first half and a second half, wherein the first half and the second half are joined to each other at an inner seam and an outer seam. In various embodiments, a portion of the barrel liner overwraps at least one of the first coil section or the second coil section.

An aspirator method is also provided. The method may comprise the steps of coupling a plurality of coil sections to form a helical coil, wherein each coil section comprises a first half and a second half, coupling the helical coil about an inner seam of the coil sections along an axis of a barrel liner, and overwrapping a portion of a coil section with a portion of the barrel liner to form an inflatable barrel; and coupling the inflatable barrel to an aspirator body. In various embodiments, the method may further comprise inflating the inflatable barrel and aspirating air through the aspirator and the interior volume of the inflatable barrel.

In various embodiments, wherein the aspirator comprises a longitudinal axis parallel to the axis of the barrel liner, and wherein the inflatable barrel extends in a direction parallel to the longitudinal axis of the aspirator in response to inflation. In various embodiments, the method may further comprise directing the flow from the inflatable barrel into an inflatable evacuation device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to aspirators for inflatable devices. In various embodiments, the aspirator may include inflatable features such as an inflatable barrel. The inflatable features allow the aspirator to be made having a shorter length while still achieving efficient inflation. A smaller size aspirator allows the aspirator to occupy less storage space within the packboard of the aircraft.

Figure 1A:
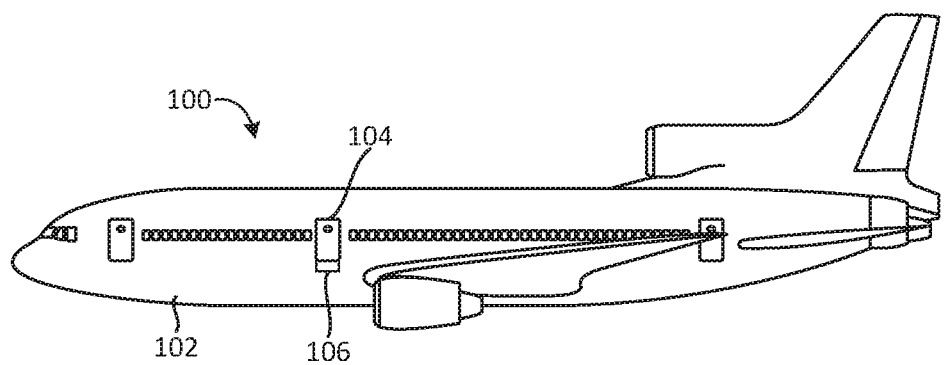
FIG. 1A illustrates a perspective view of an aircraft having an evacuation system, in accordance with various embodiments.

Referring to FIG. 1A, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever or other various types of signal devices as known to those skilled in the art.

Figure 1B:
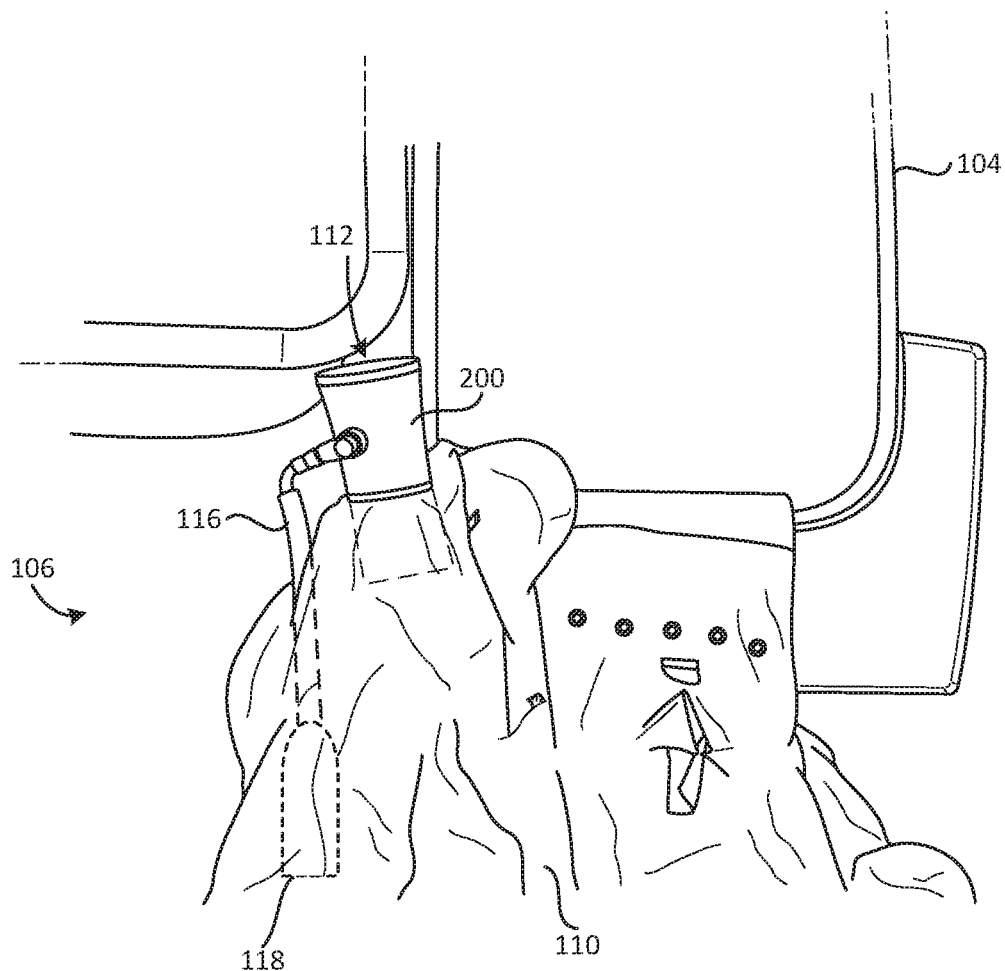
FIG. 1B illustrates an evacuation system of an aircraft, in accordance with various embodiments.

Referring to FIGS. 1A and 1B, additional details of evacuation system 106 are illustrated, in accordance with various embodiments. In particular, evacuation system 106 includes an inflatable evacuation device 110. Inflatable evacuation device 110 may be a slide, a slide raft, a life raft, a floatation device or other evacuation device, which may be inflatable. Evacuation system 106 further includes a source of forced gas 112. The source of forced gas 112 may cause a gas to enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, the source of forced gas 112 may include an aspirator 200 coupled to the inflatable evacuation device 110, piping 116 coupled to the aspirator 200, and a compressed fluid source 118 coupled to the piping 116. During normal flight conditions, inflatable evacuation device 110 may be deflated and stored within a compartment of aircraft 100. In various embodiments, inflatable evacuation device 110, aspirator 200, piping 116, and compressed fluid source 118 may be stored in a single package within the aircraft compartment. In response to deployment of evacuation system 106, fluid may flow into aspirator 200 via piping 116 at a relatively high velocity. This fluid flow may cause aspirator 200 to draw forced gas 112 from the environment. The fluid flow (such as in a gaseous state) and the forced gas 112 may be directed into the inflatable evacuation device 110. In response to receiving the fluid flow and the forced gas 112, inflatable evacuation device 110 may begin to inflate.

Figure 2A:
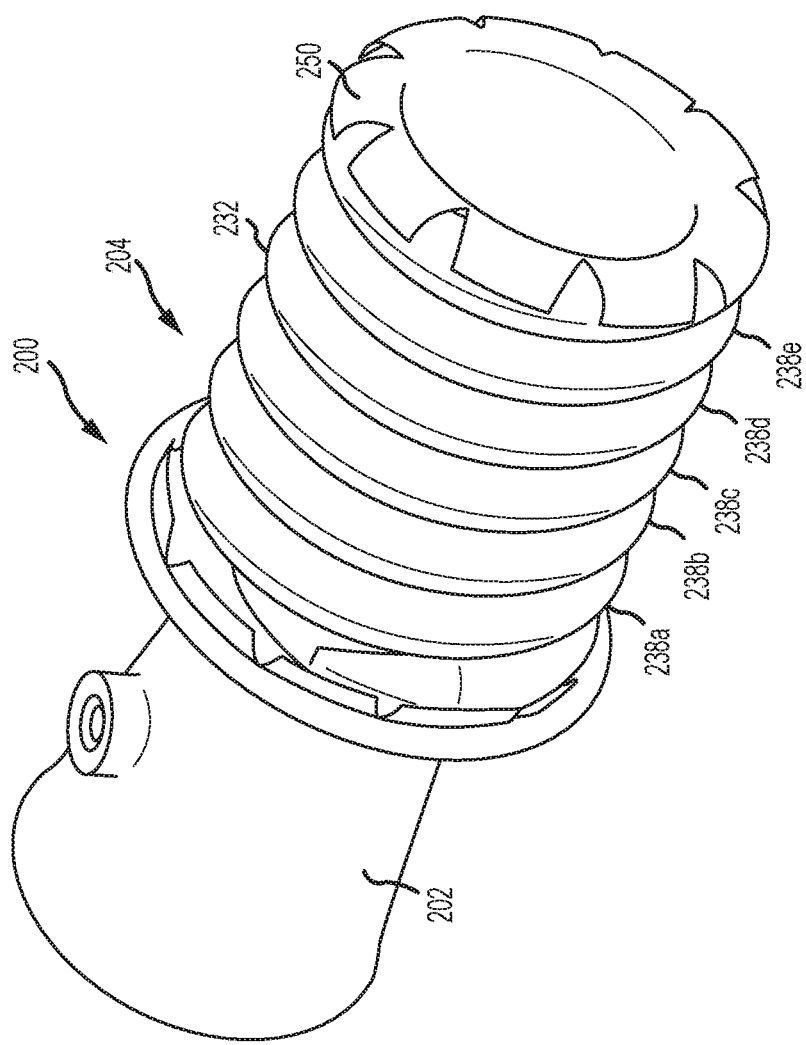
FIG. 2A illustrates an aspirator for an inflatable evacuation device, in accordance with various embodiments.
Figure 2B:
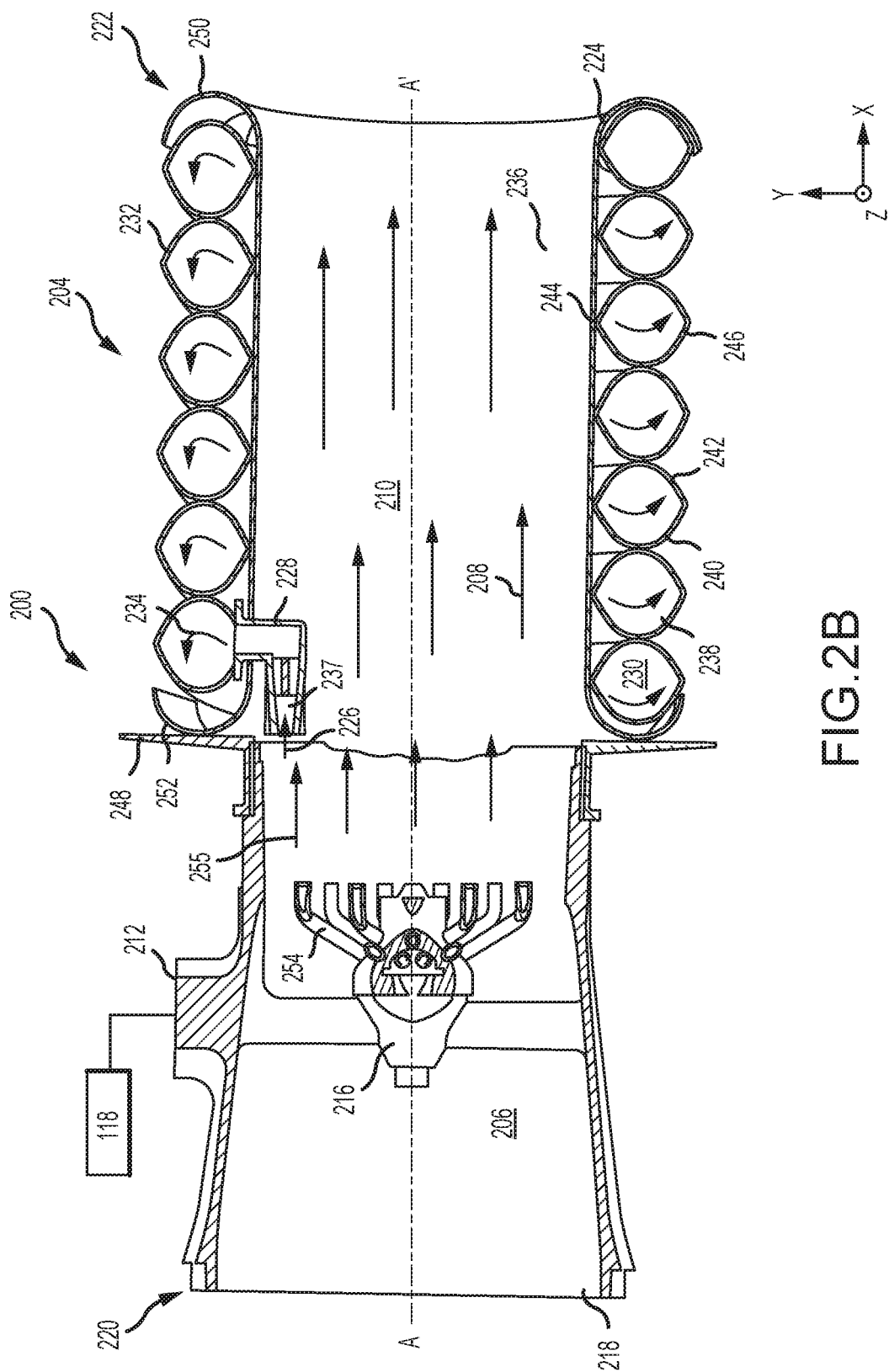
FIG. 2B illustrates a cross section of an aspirator for an inflatable evacuation device, in accordance with various embodiments.

With reference to FIGS. 2A and 2B, additional details of an aspirator 200 are shown, in accordance with various embodiments. Aspirator 200 may include an aspirator body 202 coupled to an inflatable barrel 204. Aspirator body 202 may define an air channel 206, which may be a chamber of aspirator 200 having an airflow path 208 extending into and through an interior volume 210 of inflatable barrel 204. Aspirator body 202 and/or inflatable barrel 204 may have a cylindrical geometry with a circular cross section or some other cross sectional geometry, such as square, oval, or other shape. Aspirator 200 may have a longitudinal axis A-A, and airflow path 208 may generally flow axially through aspirator 200 along longitudinal axis A-A.

Aspirator 200 may include a gas port 212 in fluid communication with air channel 206 via showerhead nozzle 216. Gas port 212 may direct a fluid from a compressed fluid source 118 (FIG. 1B, shown schematically), such as a charged cylinder, into showerhead nozzle 216 which may distribute the fluid flow into a substantially uniform flow field within air channel 206 and interior volume 210. In response to high-pressure gas moving from the compressed fluid source 118 through showerhead nozzle 216 to air channel 206 via gas port 212, gas from the environment surrounding the aspirator 200 is compelled into air channel 206 from outside the aspirator 200 through inlet 218 due to the Venturi effect. Stated differently, aspirator 200 facilitates intake of gas (i.e. forced gas 112) from the environment, which enters air channel 206 through an inlet 218 of the aspirator 200. The airflow path 208 through air channel 206 and interior volume 210 is illustrated as flowing in the positive x-direction on the provided xyz axes.

As used herein, "distal" refers to the direction toward the positive x-direction on the provided xyz axes relative to aspirator 200. As used herein, "proximal" refers to a direction toward the negative x-direction on the provided xyz axes relative to aspirator 200. The term "upstream" is used to refer to directions and positions located closer to a gas source than directions and positions referenced as "downstream."

Aspirator 200 may include a proximal end 220 having inlet 218 defined by aspirator body 202. Aspirator 200 may include a distal end 222 having an outlet 224 defined by inflatable barrel 204. In various embodiments, aspirator 200 may be coupled to inflatable evacuation device 110 at flange 248 and distal end 222 of inflatable barrel 204 may extend into inflatable evacuation device 110 (FIG. 1B). A gas may flow into aspirator body 202 through inlet 218. Gas may flow downstream through aspirator 202, shown by airflow path 208, in generally an axial direction relative to the longitudinal axis A-A' of aspirator 202. Gas may flow through aspirator body 202 within air channel 206 and through inflatable barrel 204 within interior volume 210, exit inflatable barrel 204 through outlet 224, and flow into inflatable evacuation device 110 (FIG. 1B).

In various embodiments, inflatable barrel 204 may comprise a helical coil 232 winding about and coupled radially outward of barrel liner 236. In various embodiments, barrel liner 236 may define interior volume 210 (e.g., a second interior volume). In various embodiments, helical coil 232 may comprise a plurality of coils sections or windings 238 (e.g., 238a-e) which may define an axial length of inflatable barrel 204 along axis A-A'. In various embodiments, each winding 238 further comprises a first half 240 and a second half 242 joined at inner seam 244 and outer seam 246. In various embodiments, a first portion 250 of barrel liner 236 may be coupled to and overwrap a coil section proximate to distal end 222. In various embodiments, a second portion 252 of barrel liner 235 may be coupled to and overwrap a coil section proximate to flange 248. In various embodiments, an outer barrel liner may overwrap helical coil 232 and may be coupled to helical coil 232.

In various embodiments, a portion 226 of gas flow may be directed through a check valve 228 and into an interior volume 230 (such as, for example, a first interior volume) of helical coil 232. In response to gas 234 entering interior volume 230 of helical coil 232, first half 240 and a second half 242 may be forced relatively apart and inflatable barrel 204 may tend to inflate. In response to inflatable barrel 204 inflating, helical coil 232 may tend to extend tending thereby to drive distal end 222 axially (along axis A-A') away from proximate end 220. In this regard, barrel liner 236 may tend to be stretched between flange 248 and distal end 222 tending thereby to provide structural rigidity to inflatable barrel 204 in response to inflation. In various embodiments, an arm 254 of showerhead nozzle 216 may configured to align with intake opening 237 of check valve 228. In this regard, high-pressure gas flow 255 from compressed fluid source 118 may be directed into the interior volume 230 of helical coils 232 tending to speed inflation of inflatable barrel 204 and tending to increase the structural rigidity of inflatable barrel 204 in response to the increase in pressure of high-pressure gas flow 255 with respect to the pressure of airflow path 208. In various embodiments, check valve 228 may be coupled to and in fluid communication with compressed fluid source 118 and may further comprise a regulator.

In various embodiments, an inflatable barrel comprising a helical coil may comprise a thermoplastic synthetic ripstop polymer fabric such as, for example, nylon, ballistic nylon, polypropylene, polyester, or any other suitable material, and may be selected or treated to be substantially impermeable to gas. In various embodiments, a helical coil may be bonded by an adhesive bond or glue such as, for example, a two part adhesive, or may be chemically welded, or may be bonded by mechanical welding such as, for example, thermal or ultrasonic welding. In various embodiments, an inflatable barrel comprising a helical coil may be manufactured by molding, or by an additive manufacturing technique such as, for example, 3D printing and may comprise one of a polyurethane reinforced with a nanomaterial such as, for example, graphene fibers or clay particles.

Figure 3:
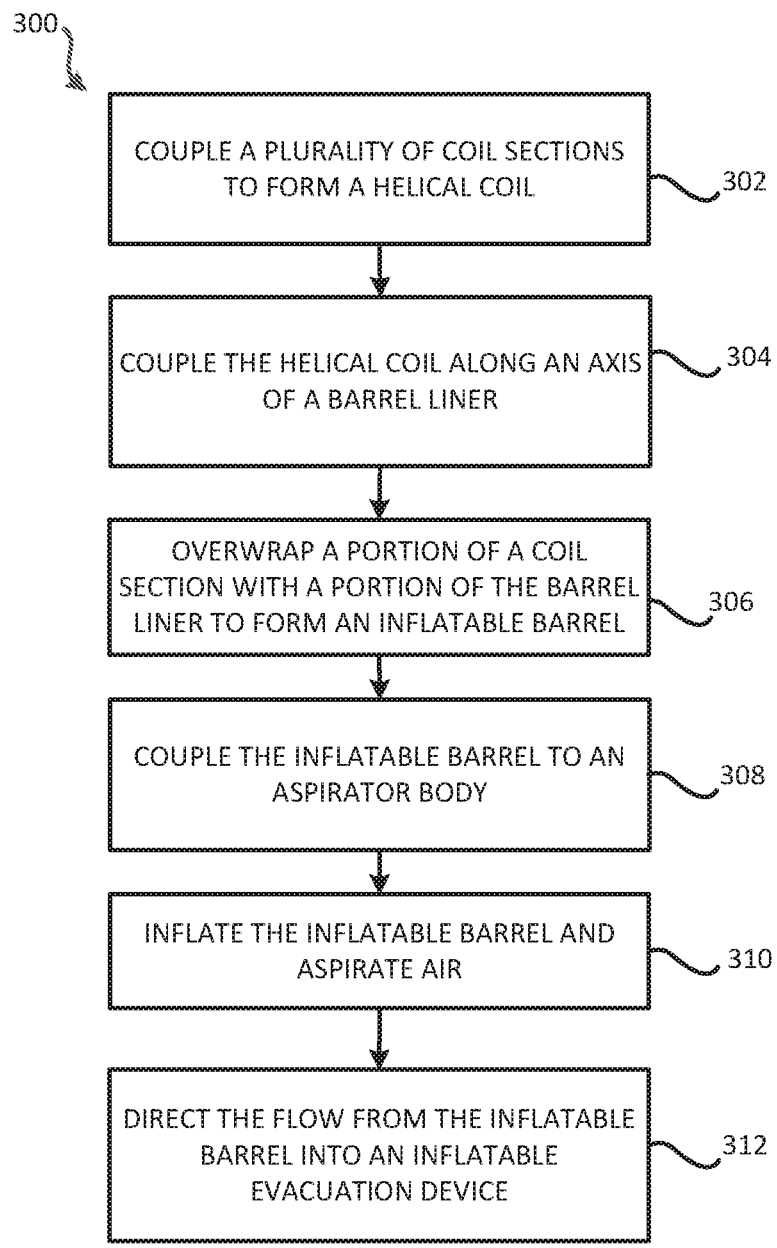
FIG. 3 illustrates a method for manufacturing an aspirator, in accordance with various embodiments.

With reference to FIG. 3, a method 300 of manufacturing an aspirator comprising an inflatable barrel is shown, in accordance with various embodiments. Method 300 may comprise the steps of coupling a plurality of coil sections to form a helical coil, wherein each coil section comprises a first half and a second half (step 302), coupling the helical coil about an inner seam of the coil sections along an axis of a barrel liner a (step 304), overwrapping a portion of a coil section with a portion of the barrel liner to form an inflatable barrel (step 306), and coupling the inflatable barrel to an aspirator body (step 308). Method 300 may further comprise the steps of inflating the inflatable barrel and aspirating air through the aspirator and the interior volume of the inflatable barrel (310). Method 300 may comprise the step of directing flow from the interior volume of the inflatable barrel into an inflatable evacuation device (step 312).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator, comprising:
   an aspirator body defining an air channel and an inlet at a proximate end of the aspirator; and
   an inflatable barrel coupled to the aspirator body and defining an outlet at a distal end of the aspirator; wherein,
   the inflatable barrel comprises a helical coil having a first interior volume and coupled about a barrel liner, wherein the barrel liner defines a second interior volume, wherein the air channel and the second interior volume define an airflow path extending from the air channel through the second interior volume of the inflatable barrel.

2. The aspirator of claim 1, wherein the aspirator comprises a longitudinal axis, and wherein the inflatable barrel extends in a direction parallel to the longitudinal axis of the aspirator in response to inflation.

3. The aspirator of claim 2, wherein the inflatable barrel further comprises a check valve in fluid communication with the first interior volume and the second interior volume.

4. The aspirator of claim 3, wherein the check valve is coupled to a compressed fluid source.

5. The aspirator of claim 3, further comprising a showerhead nozzle, wherein an arm of the showerhead nozzle is configured to align with an intake opening of the check valve.

6. The aspirator of claim 1, wherein the helical coil comprises a first coil section and a second coil section.

7. The aspirator of claim 6, wherein the first coil section is proximate a flange coupled to the aspirator body and the second coil section is proximate the distal end.

8. An evacuation system for use with an aircraft, comprising:
   an inflatable evacuation device configured to be inflated by a compressed fluid source; and
   an aspirator coupled to the compressed fluid source and to the inflatable evacuation device, the aspirator comprising:
   an aspirator body defining an air channel and an inlet at a proximate end of the aspirator; and
   an inflatable barrel coupled to the aspirator body and defining an outlet at a distal end of the aspirator; wherein,
   the inflatable barrel comprises a helical coil having a first interior volume and coupled about a barrel liner, wherein the barrel liner defines a second interior volume, wherein the air channel and the second interior volume define an airflow path extending from the air channel through the second interior volume of the inflatable barrel.

9. The evacuation system of claim 8, wherein the aspirator comprises a longitudinal axis, and wherein the inflatable barrel extends in a direction parallel to the longitudinal axis of the aspirator in response to inflation.

10. The evacuation system of claim 9, wherein the inflatable barrel further comprises a check valve in fluid communication with the first interior volume and the second interior volume.

11. The evacuation system of claim 10, wherein the check valve is coupled to the compressed fluid source.

12. The evacuation system of claim 10, wherein the aspirator further comprises a showerhead nozzle, wherein an arm of the showerhead nozzle is configured to align with an intake opening of the check valve.

13. The evacuation system of claim 8, wherein the helical coil comprises a first coil section and a second coil section.

14. The evacuation system of claim 13, wherein the first coil section is proximate a flange coupled to the aspirator body and the second coil section is proximate the distal end, wherein the flange is coupled to the inflatable evacuation device with the distal end within the interior of the evacuation device.

15. The evacuation system of claim 13, wherein at least one of the first coil section or the second coil section further comprise a first half and a second half, wherein the first half and the second half are joined to each other at an inner seam and an outer seam.

16. The evacuation system of claim 13, wherein a portion of the barrel liner overwraps at least one of the first coil section or the second coil section.

17. An aspirator method, comprising;
    coupling a plurality of coil sections to form a helical coil, wherein each of the coil sections comprises a first half and a second half;
    coupling the helical coil about an inner seam of the coil sections along an axis of a barrel liner; and
    overwrapping a portion of a coil section with a portion of the barrel liner to form an inflatable barrel; and coupling the inflatable barrel to an aspirator body.

18. The aspirator method of claim 17, further comprising inflating the inflatable barrel and aspirating air through the aspirator and an interior volume of the inflatable barrel.

19. The aspirator method of claim 18, wherein the aspirator body comprises a longitudinal axis parallel to the axis of the barrel liner, and wherein the inflatable barrel extends in a direction parallel to the longitudinal axis of the aspirator body in response to inflation.

20. The aspirator method of claim 17, further comprising directing a flow from the inflatable barrel into an inflatable evacuation device.

* * * * *